June 3, 1930. M. E. JONES 1,761,833
SPEEDOMETER DRIVE FOR MOTOR CYCLES
Filed Oct. 27, 1924
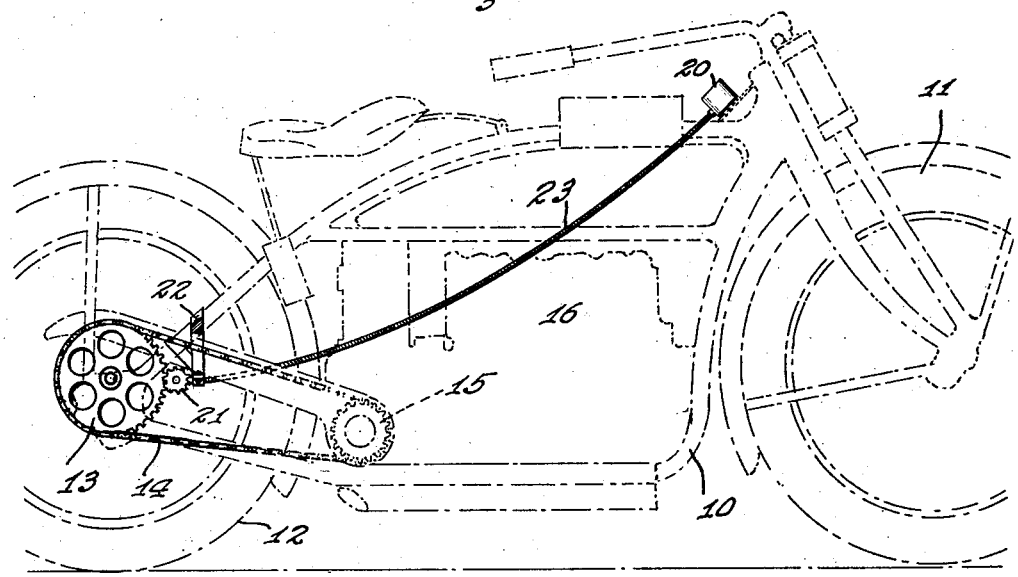
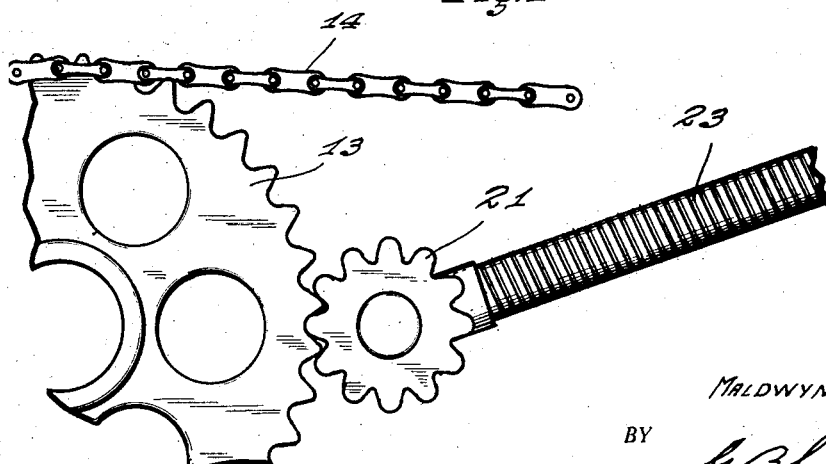
INVENTOR.
MALDWYN E. JONES,
BY
ATTORNEY.

Patented June 3, 1930

1,761,833

UNITED STATES PATENT OFFICE

MALDWYN EVANS JONES, OF INDIANAPOLIS, INDIANA

SPEEDOMETER DRIVE FOR MOTOR CYCLES

Application filed October 27, 1924. Serial No. 746,013.

It is the object of my invention to simplify and cheapen certain driving mechanism especially for a motorcycle speedometer.

It is usual in driving the speedometer of a motorcycle to mount a special gear on one of the motorcycle wheels, usually the rear wheel, with which special gear meshes a pinion which is connected to the flexible shaft leading to the speedometer. This is both expensive and troublesome. It involves mounting the main speedometer-driving gear on the spokes of the rear wheel, so that the gear gets out of true if any of the spokes stretch or break. In addition, it is unsightly, especially as this main gear is ordinarily bigger than the brake drum.

By my invention, I do away entirely with this extra gear. Instead of driving the speedometer-driving pinion from such a special gear, I drive it from the sprocket which forms part of the chain-drive for the driving wheel of the motorcycle. That is, the pinion on the end of the flexible shaft leading to the speedometer is mounted to mesh as a gear with the sprocket of the chain drive for the rear wheel of the motorcycle, desirably with the sprocket on the rear wheel itself. Thus such sprocket serves both as a sprocket in the chain drive for the wheel and as a gear in the gear drive for the speedometer.

The accompanying drawing illustrates my invention: Fig. 1 is a side elevation of a motorcycle having a speedometer drive equipped with my invention, the driving mechanism for the rear wheel and the speedometer being shown in full lines, and the motorcycle as a whole being shown in broken lines; and Fig. 2 is an enlarged fragmental view showing the sprocket cooperating both with the chain which drives it and the pinion which it drives.

The motorcycle has the usual frame 10, front wheel 11, and rear wheel 12, with the usual sprocket 13 on the rear wheel 10 for driving it. As is usual, this sprocket 13 is connected by a chain 14 to a suitable sprocket 15 driven by the usual engine 16. The parts 10 to 16 inclusive may conform to any ordinary construction.

The chain 14 meshes with a fraction— one-half, more or less—of the circumference of each sprocket 13 and 15; but between the two stretches of the chain 14 there are a number of teeth of each sprocket which are out of mesh with the chain. I make use of these chain-free teeth to drive the speedometer 20, which is mounted on the frame 10 in any usual and convenient location. To this end, I provide a pinion 21 which meshes with one of the sprockets of the chain drive, desirably with the sprocket 13 on the rear or driving wheel 10, at a point where such sprocket is free of the chain 14. That is, the sprocket 21 is suitably mounted on the frame 10 so that it is located between the sprockets 13 and 15, and between the two stretches of the chain 14, and so that it is in mesh with one of such sprockets, here the sprocket 13. While the pinion 21 may have teeth of any shape, I prefer to provide it with teeth of suitable shape to co-operate with the sprocket teeth of the sprocket 13. While this tooth arrangement is not a theoretically correct gear-tooth structure, I have found in actual practice that it is entirely effective and sufficient for driving the pinion 21 from the sprocket 13.

The pinion 21 is mounted in any suitable supporting structure 22 carried by the frame 10, which supporting structure may be of any ordinary construction. The pinion 21 is suitably connected to the rear lower end of a flexible shaft 23, which leads forward and upward to the speedometer 20 to drive such speedometer.

While by way of example I have described my invention in connection with the speedometer drive of a motorcycle, in which use it is especially desirable, it is not limited to that specific drive but is broadly applicable to all that is included within the scope of the appended claims.

I claim as my invention:—

1. In combination with a motorcycle frame having rearwardly convergent upper and lower frame bars providing a space therebetween, a road wheel journaled in the frame, a chain sprocket carried by said road wheel and having teeth separated by rounded roller cavities, a driving chain extending from the lower portion of the sprocket, about the rear and over the top of the same and leaving the front portion of the sprocket bare and exposed to the unoccupied space between the convergent frame bars, a bracket mounted on one of the said frame bars partly in the space between the two, a pinion having rounded substantially cylindrical faced teeth to fit the roller cavities in the chain sprocket, said round tooth sprocket being supported by said bracket in the space between the frame bars in mesh with the unused teeth of the chain sprocket at the forward uncovered side of the same and thereby directly driven by said chain driven sprocket and a speedometer or like drive shaft actuated by said round tooth pinion.

2. In combination with a motorcycle having a chain sprocket on one wheel and a drive chain extending about a portion of said sprocket but clear of the remainder of the same, said unused portion of the chain sprocket being exposed to a clear space between the opposite runs of the drive chain, a pinion having teeth spaced in accordance with the spacing of the chain sprocket teeth and rounded to enter into the chain bearing cavities between the sprocket teeth, a supporting bracket for said pinion, means for securing said bracket on the motorcycle in position to locate the pinion in the unoccupied space between the runs of the drive chain and in driven engagement with the bare unusual teeth of the chain sprocket and a speedometer or like drive shaft supported by said bracket and driven by said sprocket driven pinion.

3. In combination, a chain-sprocket having an annular series of chain-engaging teeth, a chain engaging said series of teeth for only a portion of the circumference of the sprocket, a pinion having an annular series of teeth shaped to mesh with the chain-engaging teeth of said sprocket, and means for rotatably supporting said pinion in association with said sprocket with the pinion teeth engaging the sprocket teeth at a point on the sprocket-circumference where the sprocket teeth are free from engagement with said chain.

4. In combination with a chain drive having two toothed sprockets and a chain interconnecting them, a pinion having teeth shaped to mesh with the chain-engaging teeth of one of said sprockets, and means for rotatably supporting said pinion in mesh with one of said sprockets at a point between the two stretches of chain extending to the other sprocket.

5. In a motor-cycle, a driving wheel, a toothed chain sprocket rotatable with said driving wheel, means for driving said wheel, said means including a chain engaging said sprocket for a portion of its circumference, a driven-device mounted on said motorcycle, means for driving said driven device from said sprocket, said last-named means including a pinion having teeth shaped to mesh with the chain-engaging teeth of said sprocket, and means for rotatably supporting said pinion in mesh with said sprocket at a point on the sprocket circumference where the sprocket teeth are free from engagement with said chain.

In witness whereof, I have hereunto set my hand at Indianapolis, Indiana, this 17th day of October, A. D. one thousand nine hundred and twenty four.

MALDWYN EVANS JONES.